United States Patent
Kim

(10) Patent No.: US 7,656,119 B2
(45) Date of Patent: Feb. 2, 2010

(54) APPARATUS AND METHOD FOR PROTECTING MOBILE COMMUNICATION TERMINAL HAVING INSTALLED BATTERY FROM OVER VOLTAGE ELECTRIC CHARGING

(75) Inventor: Sang Woo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/217,035

(22) Filed: Aug. 30, 2005

(65) Prior Publication Data

US 2006/0043936 A1  Mar. 2, 2006

(30) Foreign Application Priority Data

Sep. 2, 2004  (KR) .................. 10-2004-0069883

(51) Int. Cl.
*H02J 7/00* (2006.01)
*H02J 7/04* (2006.01)

(52) U.S. Cl. ............ 320/106; 320/121; 320/114; 320/134; 320/148

(58) Field of Classification Search ............ 320/106, 320/121, 134, 114, 148
See application file for complete search history.

(56) References Cited

U.S. PATENT DOCUMENTS 4,602,204 A * 7/1986 Hase ................... 320/153
4,609,861 A * 9/1986 Inaniwa et al. ........... 320/152
5,717,307 A * 2/1998 Barkat et al. ........... 340/636.1
5,818,200 A * 10/1998 Cummings et al. ........ 320/116
6,014,008 A * 1/2000 Hartzell et al. ........... 320/106

FOREIGN PATENT DOCUMENTS

KR  1020020090929  12/2002
KR  1020060060939  6/2006

* cited by examiner

*Primary Examiner*—Edward Tso
*Assistant Examiner*—Alexis Boateng
(74) *Attorney, Agent, or Firm*—Lee, Hong, Degerman, Kang & Waimey

(57) ABSTRACT

An apparatus for protecting a mobile communication terminal having a built-in battery from an electric charging and method thereof are disclosed, by which the mobile communication terminal is protected against a problem generated from using a false battery. The present invention includes a power unit, an electric charging control unit controlling an electric charging of the power unit, a control unit deciding whether the built-in battery is a correct battery by recognizing a serial number of the built-in battery, the control unit outputting a control signal for controlling the electric charging of the power unit, and a switching circuit switching a supply of an electric charging power applied to the battery according to the control signal of the control unit.

3 Claims, 2 Drawing Sheets

APPARATUS AND METHOD FOR PROTECTING MOBILE COMMUNICATION TERMINAL HAVING INSTALLED BATTERY FROM OVER VOLTAGE ELECTRIC CHARGING

This application claims the benefit of the Korean Patent Application No. 10-2004-0069883, filed on Sep. 2, 2004, which is hereby incorporated by reference as if fully set forth herein.

BACKGROUND OF THE INVENTION

1. Field of the Invention

The present invention relates to an apparatus for protecting a mobile communication terminal having a built-in battery from an electric charging and method thereof. Although the present invention is suitable for a wide scope of applications, it is particularly suitable for protecting the mobile communication terminal against a problem generated from using a false battery.

2. Discussion of the Related Art

Generally, an electric charging circuit of a mobile communication terminal according to a related art is shown in FIG. 1. A battery built in a mobile communication terminal is charged with electricity in two following manners.

First of all, the battery is charged with electricity by an electric charging integrated circuit (IC) 11 built in the terminal by a power source of 5V and 1 A provided via an adaptor (i1 method). If the adaptor is not a correct part, overvoltage or reverse voltage causes damage to the electric charging integrated circuit and an internal circuit of the mobile communication terminal.

Secondly, the battery is charged with electricity via a receptacle 13 (i2 method) or operational power of the mobile communication terminal is provided. In case of using a false receptacle, the battery is damaged to cause a failure. In particular, a charging voltage of the battery needs to maintain 4.2V±1%. In case of charging the battery by 4.3V, the battery swells or capacitance of the battery is lowered.

Moreover, in using the false battery, damage is caused to the mobile communication terminal. So, the demand for solving the problem rises.

SUMMARY OF THE INVENTION

Accordingly, the present invention is directed to an apparatus for protecting a mobile communication terminal having a built-in battery from an electric charging and method thereof that substantially obviate one or more problems due to limitations and disadvantages of the related art.

An object of the present invention is to provide an apparatus for protecting a mobile communication terminal having a built-in battery from an electric charging and method thereof, by which a failure or malfunction of the mobile communication terminal is prevented in using a false battery.

Another object of the present invention is to provide an apparatus for protecting a mobile communication terminal having a built-in battery from an electric charging and method thereof, by which the mobile communication terminal is protected from an overvoltage generated from using a false adaptor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an electric charging protection circuit in a mobile communication terminal having a built-in battery according to the present invention includes power unit, an electric charging control unit controlling an electric charging of the power unit, a control unit deciding whether the built-in battery is a correct battery by recognizing a serial number of the built-in battery, the control unit outputting a control signal for controlling the electric charging of the power unit, and a switching circuit switching a supply of an electric charging power applied to the battery according to the control signal of the control unit.

Preferably, the electric charging protection circuit further includes an overvoltage protection circuit protecting a charger integrated circuit and the battery from an overvoltage of the electric charging power provided via an adaptor or a receptacle.

More preferably, the overvoltage protection circuit includes a Zener diode turned on if a voltage of the electric charging power delivered via the adaptor and/or the receptacle is greater than a predetermined voltage, a first switching transistor having a base end connected to the Zener diode to be switched by an operational voltage by the turned-on Zener diode, a second switching transistor having a gate end connected to a collector end of the first switching transistor, the second switching transistor switched according to an operational state of the first switching transistor to control the electric charging power delivered via the adaptor and/or the receptacle, and a third switching transistor having a gate end connected to a drain end of the second switching transistor to control an electric charging voltage delivered via the drain end to the charger integrated circuit and/or the battery according to an operational state of the second switching transistor.

More preferably, the switching circuit includes a fourth switching transistor switched by receiving the control signal of the control unit via a base end, a fifth switching transistor having a base end connected to a collector end of the fourth switching transistor and a collector end connected to the overvoltage protection circuit, and a sixth switching transistor receiving a voltage provided from an emitter end of the fifth switching transistor via a gate end and an operational voltage provided from the charger integrated circuit via a drain end to control a supply of the electric charging power applied to the battery cell.

In another aspect of the present invention, an electric charging protection method for a mobile communication terminal having a built-in battery includes the steps of reading a serial number of the built-in battery, deciding whether the built-in battery is a correct battery by analyzing the serial number in a mobile station modem, and controlling an electric charging of the built-in battery according to a result of the deciding step.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, a configuration and operation of an apparatus for protecting a mobile communication terminal having a built-in battery from an electric charging are explained with reference to the attached drawing as follows.

Figure 1:
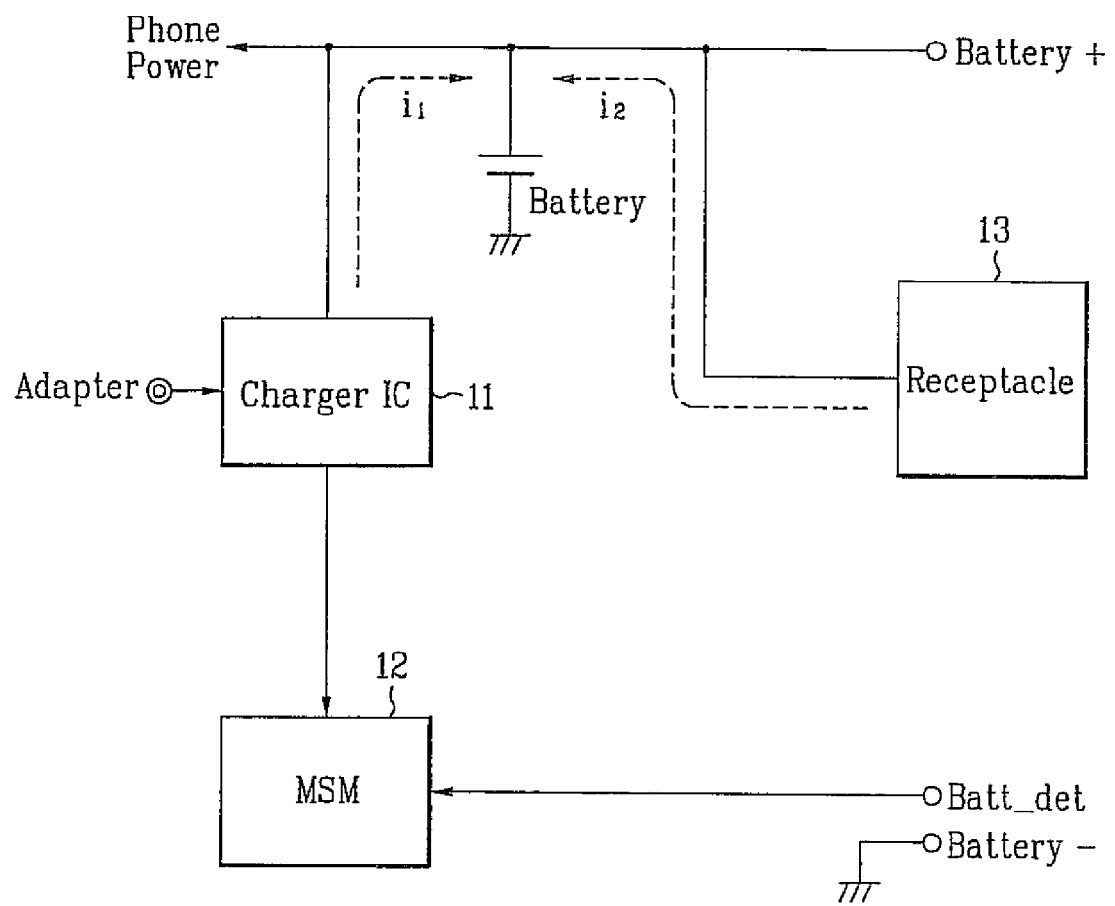
FIG. 1 is a diagram of an electric charging circuit of a mobile communication terminal according to a related art.
Figure 2:
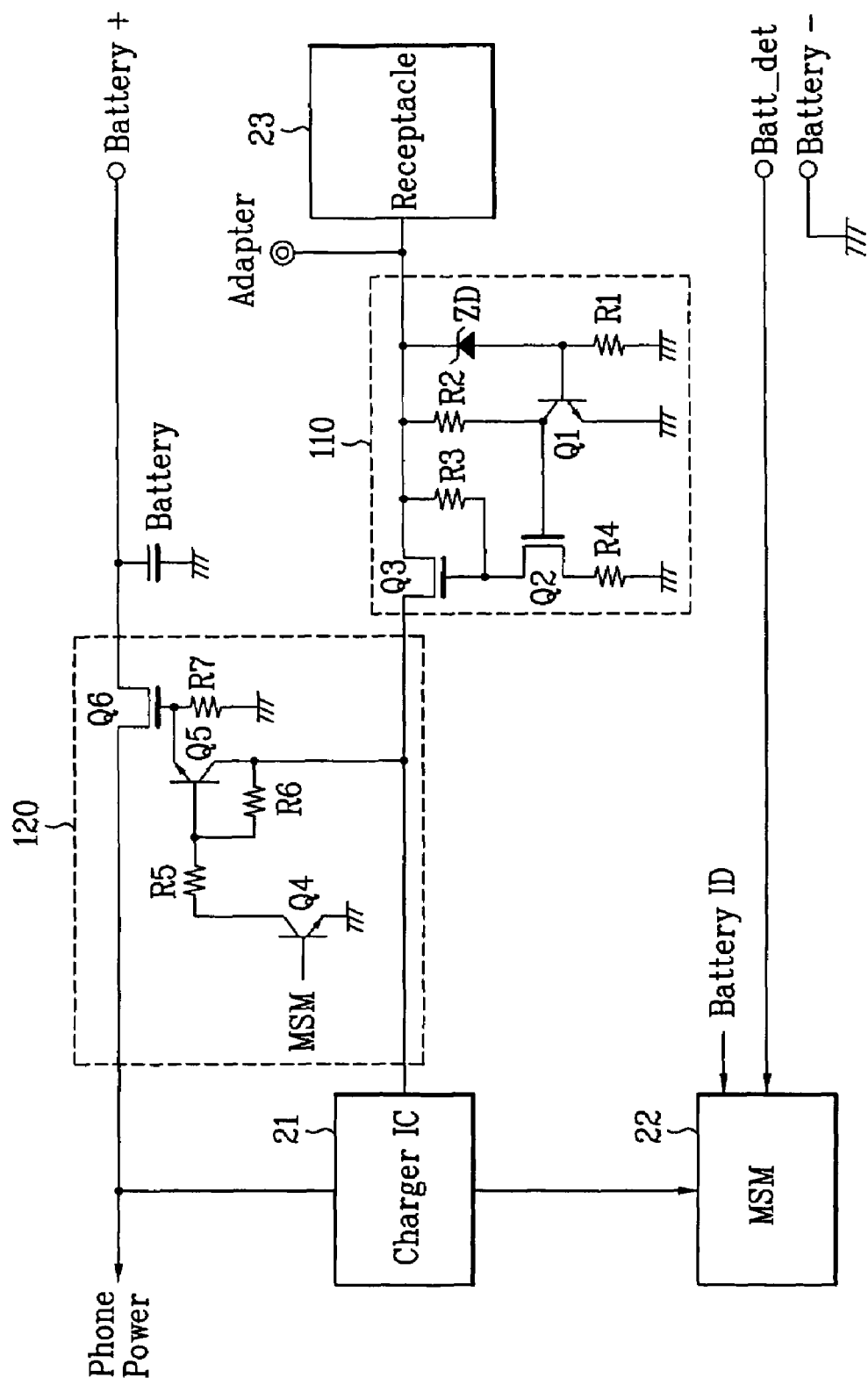
FIG. 2 is a diagram of an electric charging circuit of a mobile communication terminal according to the present invention.

FIG. 2 is a diagram of an electric charging circuit of a mobile communication terminal according to the present invention.

Referring to FIG. 2, an apparatus for protecting a mobile communication terminal having a built-in battery from an electric charging according to the present invention includes a charger IC 21 provided with a charging power DC via an adaptor and/or a receptacle 23 to control an electric charging of a battery cell built in the mobile communication terminal, a mobile station modem (hereinafter abbreviated MSM) 22 deciding whether the battery is a correct part by recognizing a serial number of the built-in battery cell, the MSM 22 outputting a control signal for controlling the electric charging of the battery cell (controlling a supply of power provided to the mobile communication terminal) according to a result of the decision, a switching circuit 120 switching a supply of an electric charging power applied to the battery cell according to the control signal of the MSM 22, and an overvoltage protection circuit 110 protecting the charger IC 21 and the battery from an overvoltage of the electric charging power provided via the adaptor or the receptacle 23.

A Li-ion battery is widely used as the built-in battery cell.

The overvoltage protection circuit 110 includes a Zener diode ZD turned on if a voltage of the electric charging power delivered via the adaptor and/or the receptacle 23 is greater than a predetermined voltage, a first switching transistor Q1 having a base end connected to the Zener diode ZD to be switched by an operational voltage by the turned-on Zener diode ZD, a second switching transistor Q2 having a gate end connected to a collector end of the first switching transistor Q1, the second switching transistor Q2 switched according to an operational state of the first switching transistor Q1 to control the electric charging power delivered via the adaptor and/or the receptacle, and a third switching transistor Q3 having a gate end connected to a drain end of the second switching transistor Q2 to control an electric charging voltage delivered via the drain end to the charger IC 21 and/or the battery according to an operational state of the second switching transistor Q2.

The switching circuit 120 includes a fourth switching transistor Q4 switched by receiving the control signal of the MSM 22 via a base end, a fifth switching transistor Q5 having a base end connected to a collector end of the fourth switching transistor Q4 and a collector end connected to the overvoltage protection circuit 110, and a sixth switching transistor Q6 receiving a voltage provided from an emitter end of the fifth switching transistor Q5 via a gate end and an operational voltage provided from the charger IC 21 via a drain end to control a supply of the electric charging power applied to the battery cell. And, reference numbers R1 to R7 are resistors used for signal transfer and the like.

An operation of the above-configured apparatus for protecting the mobile communication terminal having the built-in battery from the electric charging according to the present invention is explained as follows.

First of all, a memory storing information of a product such as a manufacturer, manufacturing serial number and the like is included in a battery built in a mobile communication terminal. The present invention intends to use the information in solving the problem generated from using a false battery.

Battery information (battery ID) is provided to the MSM 22. The MSM 22 analyzes the battery information to decide whether the battery is a correct battery. A result of the decision is delivered to the base end of the fourth switching transistor Q4 of the switching circuit 120. Namely, if the battery is the correct battery, each of the fourth and fifth switching transistors Q4 and Q5 maintains its turned-off state. A drive potential difference occurs between the drain and source ends of the sixth switching transistor Q6. And, the power provided from the adaptor is transferred to the battery to charge.

If the battery is analyzed as a false battery, the fourth switching transistor Q4 is turned on to turn off the sixth switching transistor Q6 so that the electric charging power stops being applied to the battery.

Meanwhile, the communication terminal circuit and battery need to be protected from the overvoltage generated in case of using a false adaptor or receptacle. For this, the present invention provides the overvoltage protection circuit 110. If a voltage delivered via the adaptor or receptacle is greater than a reference voltage, the Zener diode ZD is turned on. As the Zener diode is turned on, an operational voltage of the first switching transistor Q1 is generated to keep the first switching transistor Q1 in a turned-on state.

Once the first switching transistor Q1 is turned on a voltage difference between the gate and source ends to drive the second switching transistor Q2 is not generated. Hence, the second and third switching transistors Q2 and Q3 are turned off to cut off the power delivered to the charger IC 21 and the battery.

Accordingly, the present invention prevents the damage caused by the false battery or by the false adaptor or receptacle.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An electric charging protection circuit in a mobile communication terminal having an installed battery, comprising:
   a charger integrated circuit controlling an electric charging of the installed battery with an electric charging power via an adaptor or a receptacle;
   a control unit deciding whether the installed battery is a correct battery by recognizing a serial number of the installed battery, the control unit outputting a control signal for controlling the electric charging according to a result of the decision;

a switching circuit switching a supply of an electric charging power applied to the installed battery according to the control signal of the control unit; and an overvoltage protection circuit configured to protect the charger integrated circuit and the installed battery from an overvoltage of the electric charging power provided via the adapter or the receptacle, wherein the overvoltage protection circuit disconnects the electric charging power provided from the adaptor or the receptacle when an electric charging power voltage is greater than a predetermined voltage, wherein the overvoltage protection circuit comprises:

a Zener diode turned on if the voltage of the electric charging power delivered via the adapter and/or the receptacle is greater than the predetermined voltage;

a first switching transistor having a base end connected to the Zener diode to be switched by an operational voltage by the turned-on Zener diode;

a second switching transistor having a gate end connected to a collector end of the first switching transistor, the second switching transistor switched according to an operational state of the first switching transistor to control the electric charging power delivered via the adaptor and/or the receptacle; and a third switching transistor having a gate end connected to a drain end of the second switching transistor to control an electric charging voltage delivered via the drain end to the charger integrated circuit and/or he battery according to an operational state of the second switching transistor.

2. The electric charging protection circuit of claim 1, wherein the switching circuit comprising:

a fourth switching transistor switched by receiving the control signal of the control unit via a base end;

a fifth switching transistor having a base end connected to a collector end of the fourth switching transistor and a collector end connected to the overvoltage protection circuit; and a sixth switching transistor receiving a voltage provided from an emitter end of the fifth switching transistor via a gate end and an operational voltage provided from the charger integrated circuit via a drain end to control a supply of the electric charging power applied to the battery cell.

3. An electric charging protection method for a mobile communication terminal having an installed battery, comprising the steps of:

reading battery information stored in a memory of the installed battery;

deciding whether the installed battery is a correct battery by analyzing the battery information in a mobile station modem;

controlling an electric charging of the installed battery with an electric charging power via an adaptor or a receptacle according to a result of the deciding step; and comparing a charging voltage from one of the adapter and the receptacle with an overvoltage reference voltage and disconnecting the charging voltage when the charging voltage is greater than the overvoltage reference voltage, wherein the charging voltage is delivered to a charger integrated circuit and the installed battery.

\* \* \* \* \*